(12) United States Patent
Gomes et al.

(10) Patent No.: US 6,636,201 B1
(45) Date of Patent: Oct. 21, 2003

(54) ACOUSTIC TOUCHSCREEN HAVING WAVEGUIDED REFLECTOR ARRAYS

(75) Inventors: Paulo Irulegui Gomes, Redwood City, CA (US); Joel Kent, Fremont, CA (US); James L. Aroyan, Soquel, CA (US); Shigeki Kambara, Hyogo (JP)

(73) Assignee: ELO TouchSystems, Inc., Fremont, CA (US)

( * ) Notice: Subject to any disclaimer, the term of this patent is extended or adjusted under 35 U.S.C. 154(b) by 0 days.

(21) Appl. No.: 09/579,584

(22) Filed: May 26, 2000

(51) Int. Cl.[7] ................................................. G09G 5/00
(52) U.S. Cl. ..................................... 345/173; 178/18.04
(58) Field of Search ...................... 345/173; 178/18.04, 178/18.01

(56) References Cited

U.S. PATENT DOCUMENTS

| | | | | |
|---|---|---|---|---|
| 4,644,100 A | * | 2/1987 | Brenner et al. ................. | 178/18 |
| 4,825,212 A | * | 4/1989 | Adler et al. .................. | 340/706 |
| 4,880,665 A | * | 11/1989 | Adler et al. ................. | 427/126.3 |
| RE33,151 E | * | 1/1990 | Adler ........................... | 341/20 |
| 5,162,618 A | * | 11/1992 | Knowles ...................... | 178/18 |
| 5,329,070 A | * | 7/1994 | Knowles ...................... | 178/18 |
| 5,591,945 A | * | 1/1997 | Kent ............................ | 178/19 |
| 5,739,479 A | * | 4/1998 | Davise-Cannon et al. .... | 178/19 |

\* cited by examiner

Primary Examiner—Amare Mengistu

(57) ABSTRACT

An acoustic touchscreen (1a) has transmitting transducers (23a, 23b) for generating acoustic signals which are deflected across a touch-sensitive area (2) by an array 13 of partially acoustically reflective elements 14. A touch on the touch-sensitive area causes a perturbation in the acoustic signals. After traversing the touch-sensitive area, the acoustic signals are redirected by another array 13 of partially acoustically reflective elements 14, towards receiving transducers (26a, 26b), where the signals (and any perturbations) are sensed. To accommodate touchscreens having narrow border regions (15a), the acoustic signals are propagated across the border regions using acoustic waveguides (18). The waveguide confines the acoustic signals to traveling along a narrow path width, but yet permit them to be deflected across the touch-sensitive area. In this manner, the transducers and reflective elements can in turn be of narrower construction and can fit within narrow border regions.

8 Claims, 5 Drawing Sheets

ACOUSTIC TOUCHSCREEN HAVING WAVEGUIDED REFLECTOR ARRAYS

BACKGROUND OF THE INVENTION

1. Field of the Invention

The present invention relates to acoustic touchscreens, in particular acoustic touchscreens having narrow reflective arrays and increased touch-sensitive areas.

2. Description of Related Art

An acoustic touchscreen has a touch-sensitive area on which the occurrence and location of a touch is sensed via the touch's effect on the transmission of acoustic waves thereacross. A common type of acoustic touchscreen employs Rayleigh waves (a term which, as used herein, subsumes quasi-Rayleigh waves). Illustrative disclosures relating to Rayleigh wave touchscreens include U.S. Pat. No. 4,642,423 (1987); U.S. Pat. No. 4,645,870 (1987); U.S. Pat. No. 4,700,176 (1987); U.S. Pat. No. 4,746,914 (1988); U.S. Pat. No. 4,791,416 (1988); Re 33,151 (1990); U.S. Pat. No. 4,825,212 (1989); U.S. Pat. No. 4,859,996 (1989); U.S. Pat. No. 4,880,665 (1989); U.S. Pat. No. 4,644,100 (1987); U.S. Pat. No. 5,739,479 (1998); U.S. Pat. No. 5,708,461 (1998) and U.S. Pat. No. 5,854,450 (1998). Acoustic touchscreens employing other types of acoustic waves such as Lamb or shear waves, or combinations of different types acoustic waves (including combinations involving Rayleigh waves) are also known, illustrative disclosures including U.S. Pat. No. 5,591,945 (1997) U.S. Pat. No. 5,854,450 (1998); U.S. Pat. No. 5,072,427 (1991); U.S. Pat. No. 5,162,618 (1992); U.S. Pat. No. 5,177,327 (1993); U.S. Pat. No. 5,243,148 (1993); U.S. Pat. No. 5,329,070 (1994); U.S. Pat. No. 5,573,077; and U.S. Pat. No. 5,260,521 (1993). The documents cited in this paragraph are incorporated herein by reference.

FIG. 1 illustrates the operation of a conventional acoustic touchscreen 1, having an active, or touch-sensitive area 2. A first transmitting transducer 3a is positioned outside of touch-sensitive area 2 and acoustically coupled to the surface of touchscreen 1. The transducer 3a sends an acoustic signal in the form of an acoustic wave 11a traveling parallel to the top edge of touchscreen 1 and generally in the plane of touchscreen 1. Aligned in the transmission path of acoustic wave 11a is a first linear array 13 of partially acoustically reflective elements 4, each of which partially reflects (by approximately 90°) and partially transmits the acoustic signals, creating a plurality of acoustic waves (exemplary 5a, 5b, and 5c) traveling vertically (parallel to the Y-axis) across touch-sensitive area 2. (The spacing of reflective elements 4 is variable to compensate for the attenuation of the acoustic signals with increasing distance from first transmitter 3a.) Acoustic waves 5a, 5b, and 5c, upon reaching the lower edge of touchscreen 1, are again reflected by approximately 90° (arrow 11b) by a second linear array 13 of partially acoustically reflective elements 4 towards a first receiving transducer 6a, where they are detected and converted to electrical signals for data processing. Along the left and right edges of touchscreen 1 are located a similar arrangement. A second transmitting transducer 3b generates an acoustic wave 12a along the left edge, and a third linear array 13 of partially acoustically reflective elements 4 creates therefrom a plurality of acoustic waves (exemplary 7a, 7b, and 7c) traveling horizontally (parallel to the X-axis) across touch-sensitive area 2. Acoustic waves 7a, 7b, and 7c are redirected (arrow 12b) by a fourth linear array 13 of partially acoustically reflective elements 4 towards receiving transducer 6b, where they are also detected and converted to electrical signals.

If touch-sensitive area 2 is touched at position 8 by an object such as a finger or a stylus, some of the energy of the acoustic waves 5b and 7a is absorbed by the touching object. The resulting attenuation is detected by receiving transducers 6a and 6b as a perturbation in the acoustic signal. A time delay analysis of the data with the aid of a microprocessor (not shown) allows determination of the coordinates of position 8.

Those skilled in the art will appreciate that it is not essential to have two sets of transmitting/receiving transducers to make a touchscreen. The device of FIG. 1, without one set of transducers, will still function as a touchscreen, detecting the occurrence of a touch and providing limited location information (one of the coordinates). Or, a touchscreen can be designed with only two transducers by using a common transmit/receive transducer scheme, as disclosed in FIG. 8 of U.S. Pat. No. 4,746,914.

In normal usage, a housing 9 (outline indicated by a dotted line in FIG. 1), typically made of molded polymer or sheet metal, is associated with touchscreen 1. Housing 9 contains a bezel 10 (outline also indicated by a dotted line in FIG. 1) that overlays touchscreen 1, concealing the transmitting and receiving transducers, the reflective elements, and other components, but exposing touch-sensitive area 2. This arrangement protects the concealed components from contamination and/or damage, presents a more aesthetically pleasing appearance, and defines the touch-sensitive area for the user.

A touchscreen may comprise a separate faceplate (typically made of glass, but other hard substrates may be used) overlaid on a display panel such as a cathode ray tube (CRT), a liquid crystal display (LCD), plasma, electroluminescent, or other type of display. Alternatively, it has been proposed to convert the CRT into a touchscreen by coupling the touchscreen components directly to the glass surface of the CRT, so that the CRT surface is the touch-sensitive surface. U.S. Pat. No. 4,746,914 discloses such a construction. A direct-on-CRT touchscreen construction is desirable because it eliminates a piece of glass or other material between the viewer and the CRT, increasing the perceived display brightness. Also, there are economic advantages in dispensing with the overlay glass and not having to modify CRT chassis to make room for the overlay glass.

Returning to FIG. 1, it is seen that the touch-sensitive area 2 is surrounded by border regions 15 (only two labeled), where the reflective elements 4 and the transmitting and receiving transducers 3a, 3b, 6a, and 6b are located. Reducing the width of border regions 15 increases the percentage of the frontal area of the device that may be allocated to touch-sensitive area 2. The touchscreen may also be more easily integrated and sealed with the monitor. Also, a touchscreen having narrower border regions 15 conveys the impression of a less cumbersome, sleeker design, making the product more attractive to a customer.

Further, where a touchscreen is constructed directly on the faceplate glass of a CRT, the touchscreen manufacturer may not have control over the width of border regions 15. A touchscreen manufacturer normally does not manufacture the CRT itself. Rather, the manufacturer works with the CRT as supplied by a monitor manufacturer (or, in the case of a monitor integrated with a computer CPU chassis, such as the iMac™ computer from Apple Computer, from the computer manufacturer) and must adapt to whatever border region is provided. With some CRT's, the provided border regions may be wide; with others, they may be narrow.

For the foregoing reasons, it is desirable to have the capability of making touchscreens compatible with narrower border regions 15. The key to reducing their width lies with reducing the width of arrays 13 and the transducers. However, the widths of these components are not reducible at will. The width of the array 13 is closely related to the beam width of the acoustic wave 11a, in that the deflected acoustic waves 5a, 5b, and 5c must contain sufficient acoustic energy for touch sensing purposes. If the array 13 is too narrow, only a small fraction of the acoustic wave 11a is intercepted, causing the deflected signals to be undesirably weak. Similar considerations apply with respect to the other reflector arrays. As for the transducers, a narrow transmitting transducer is undesirable because it causes the acoustic wave 11a to diffuse, due to diffractive effects. The physics of this wave mechanical effect corresponds to that of a wave passing through a narrow opening. Mathematical analysis of these wave mechanics effects are quite consistent with the observation that the width of the array 13 is also related to the size of the touch screen 1. The larger the touch screen, the wider the array 13 must be to capture enough of the acoustic signal downstream from the transducer to reflect enough signal across the touch sensitive area 2 for touch sensing purposes. Conventional touch screens have had array widths, in units of wavelengths of the acoustic signal, on the order of greater than ⅓ the square root of the array length, also in units of wavelength.

Thus, it is desirable to provide a new design for acoustic touchscreens capable of accommodating a narrower border region, via a design capable of employing narrower reflective arrays and/or narrower transducers.

BRIEF SUMMARY OF THE INVENTION

The present invention solves the aforementioned problem by using a waveguide to concentrate an acoustic wave in a border region. The waveguide effectively concentrates the acoustic energy along a narrower path width, allowing in turn the use of narrower reflective arrays and/or transducers. Accordingly, our invention provides a touchscreen, comprising (a) a substrate capable of propagating acoustic waves, having
  (i) a touch-sensitive area having a perimeter and
  (ii) a border region about the touch-sensitive area;
(b) an array of partially acoustically reflective elements having a transverse dimension, the array located in a portion of the border region and positioned to transmit or receive an acoustic signal into or out of the touch-sensitive area; (c) an acoustic waveguide located in the portion of the border region, the acoustic waveguide having a transverse dimension less than the array transverse dimension.

The invention also provides a touchscreen, comprising:
(a) a substrate capable of propagating acoustic waves, having
  (i) a touch-sensitive area having a perimeter and
  (ii) a border region about the touch-sensitive area;
(b) an array of partially acoustically reflective elements having a transverse dimension, in units of wavelength of an acoustic signal, less than ⅓ the square root of a longitudinal dimension, in units of wavelength of the acoustic signal.

BRIEF DESCRIPTION OF THE DRAWING(S)

Figure 1:
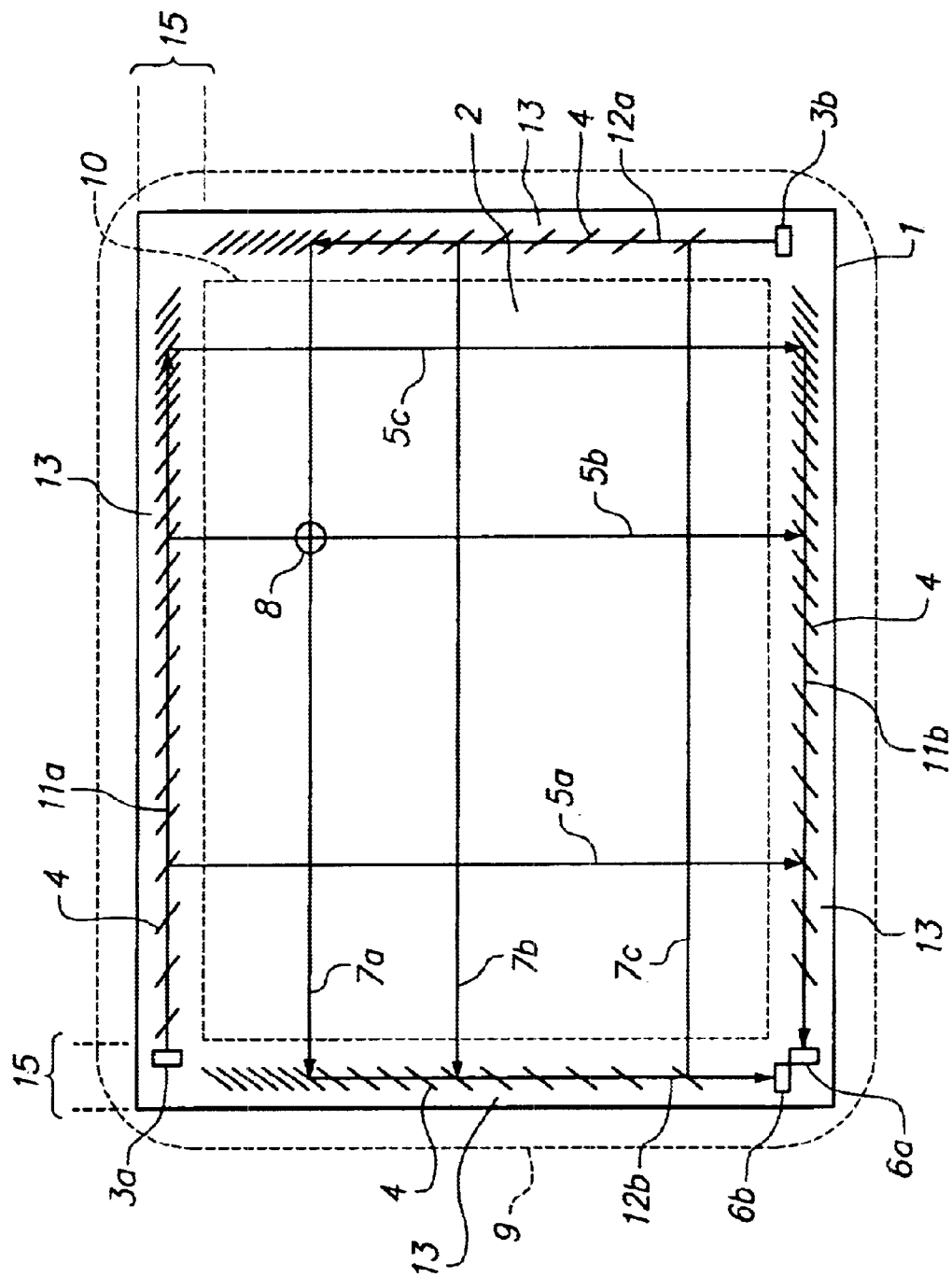
FIG. 1 shows a conventional touchscreen.

Herein, reference numerals repeated from one figure to another denote the same or equivalent elements.

DETAILED DESCRIPTION OF THE INVENTION

The acoustic signal power necessary to present a satisfactory working touchscreen depends, in part, upon the touchscreen dimensions and the corresponding reflective array length and width. The larger the touchscreen, the more signal power is necessary simply because the greater the dimensions of the touchscreen the greater the distance the acoustic signal must travel. The reflective array must have the characteristics that enable an specific/minimum amount of signal to be transmitted across the touchscreen at an end of the array downstream from the transducer. One way of adjusting the amount of signal transmitted across the touch sensitive region is increasing the width of the reflective array. By increasing the width of the reflective array more energy is captured for transmission or reception across the touchscreen. This however necessarily decreases the available touch sensitive area and increases the bezel width needed to cover the array. These are two very undesirable characteristics. In fact, this is in direct conflict to the needs of the customers, which is increased available touch sensitive region in a given touch screen size and minimizing the bezel width.

Conventional arrays have a minimum width of 0.210" (5.3 mm) or 9.3 wavelengths (assuming a conventional signal wavelength of 0.0226") and a maximum width of 0.600" (15.2 mm) or 26.5 wavelengths (also assuming a conventional signal wavelength of 0.0226") The minimum widths are used on smaller screens, on the order of 10" or 12" diagonal, and the maximum widths are used on larger screens, on the order of 20" and greater. These parameters also depend on the type of substrate of the touchscreen.

Figure 2:
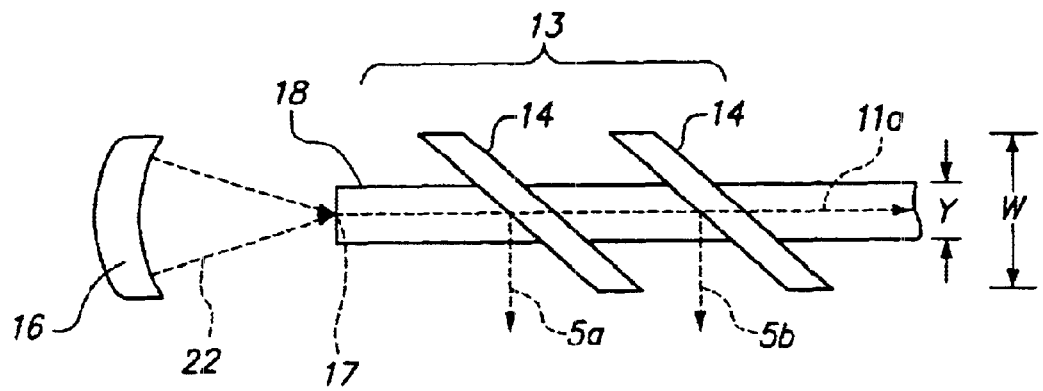
FIG. 2 shows a waveguide-reflective array combination in accordance with the present invention.

FIG. 2 illustrates a transducer 16 and a reflective array 13 of an acoustic touchscreen of the present invention that enables a narrower border region than conventional touchscreens. In the present invention, the path of the acoustic wave 11a is confined by an acoustic waveguide 18. The reflective array 13 includes a plurality of partially acoustically reflective elements 14 cooperating with the waveguide 18. This embodiment provides reflective elements 14 overlaid on top of the waveguide 18 at predetermined intervals. This arrangement effectively allows the reflective elements 14 to partially deflect energy from the incoming acoustic wave 11a across the touch-sensitive area as the acoustic waves 5a and 5b. As shown, the waveguide 18 has a transverse dimension (width) y and the reflective array 13 has a transverse dimension (width) w, that is greater than the transverse dimension y of the waveguide 18.

Figure 3:
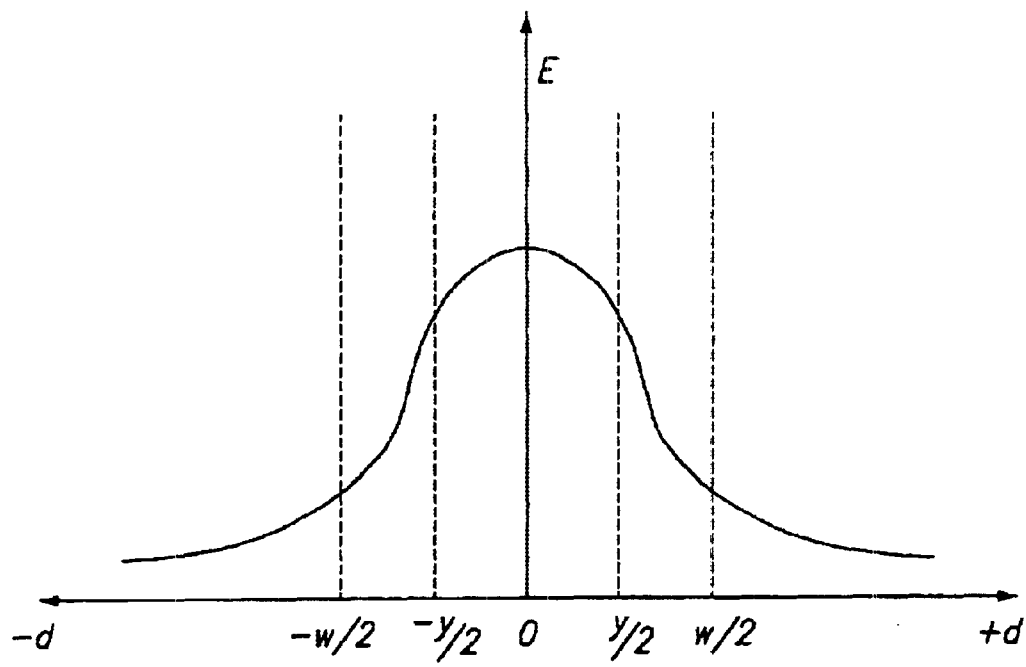
FIG. 3 shows a schematic graph of acoustic energy along the width of a waveguide in accordance with the present invention.

As illustrated in FIG. 3, a significant portion of the acoustic energy is confined to the array 14 of width w as a result of the inclusion of the waveguide 18 of width y. Because the width of the acoustic beam can be controlled by the width of the waveguide 18, the reflectors 14 may be made correspondingly narrower than conventional ones, but yet deflect a sufficient amount of acoustic energy across the touch-sensitive area for touch-sensing purposes.

Referring again to FIG. 2, in a preferred embodiment, typically but not necessarily used in conjunction with Rayleigh waves, the transmitting transducer 16 is a focusing transducer. A conventional transducer used in prior art touchscreens (such as the one illustrated in FIG. 1) generates a parallel beam of acoustic waves. The focusing transducer 16 generates a focused beam 22 of acoustic waves which come to a focus at focal point 17 at the end of waveguide 18, where they are gathered and propagated. In conventional touchscreens, without a waveguide, one must be concerned with the energy spot size at the end of the array. As such, one must typically use relatively large transducers. In the present invention, the inclusion of a waveguide alters the concern to the spot size at the entrance to the waveguide. Because the relatively short distance between the transducer and the entrance to the waveguide one can use transducers having a smaller dimension perpendicular to the array axis than in conventional touchscreens. More preferably, one could use a focusing transducer, having a focal point at the entrance to the waveguide to more effectively couple acoustic energy into the waveguide. A receiving transducer may also be of the focusing type, with similar advantages. (It should be noted that a focusing transducer normally cannot be advantageously used in a conventional touchscreen, because, without the waveguide, the acoustic wave beam will diverge beyond focal point 17.)

Figure 4:
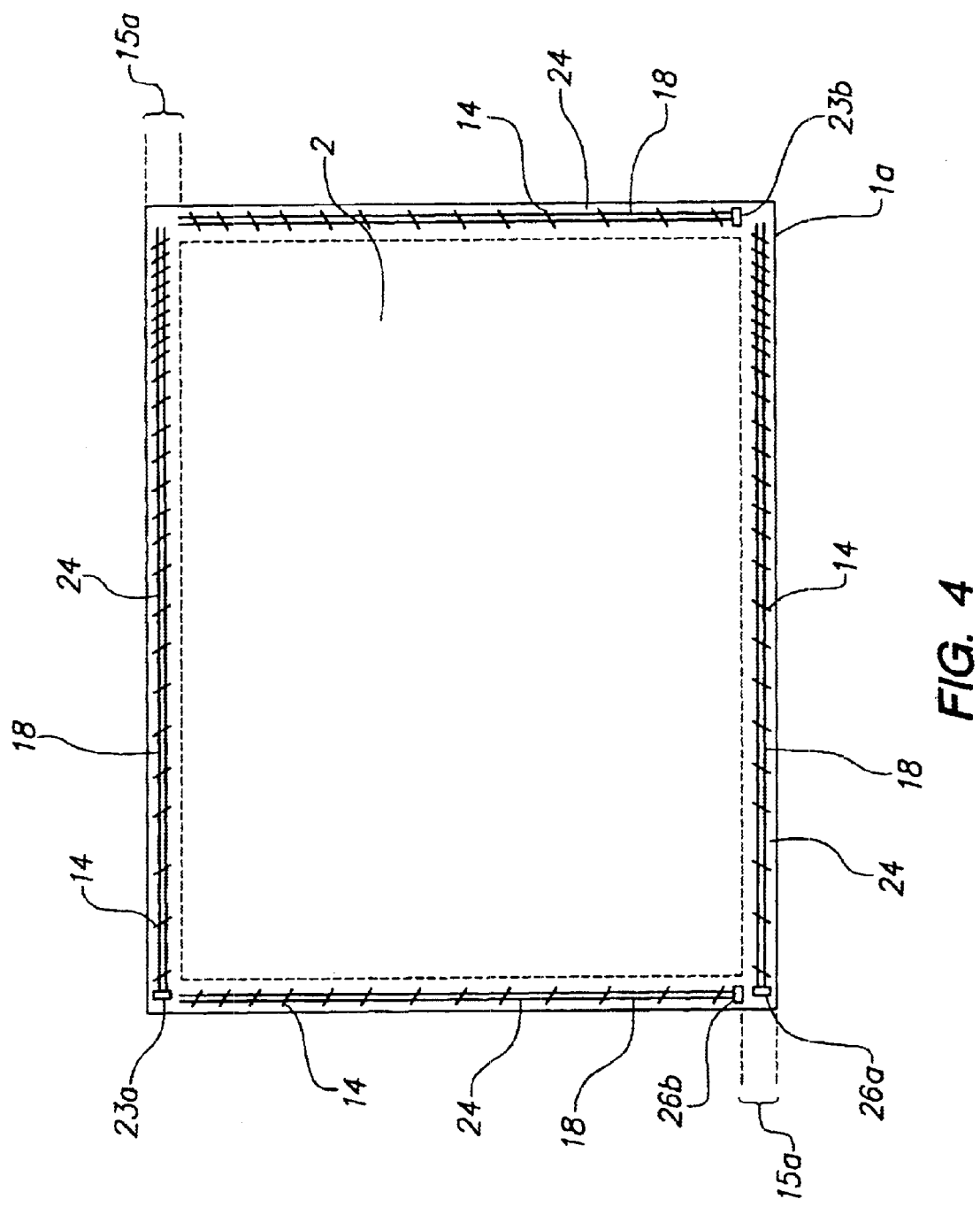
FIG. 4 shows an acoustic touchscreen according to the present invention, having a waveguide-reflective array combination of the type shown in FIG. 2.
Figure 5:
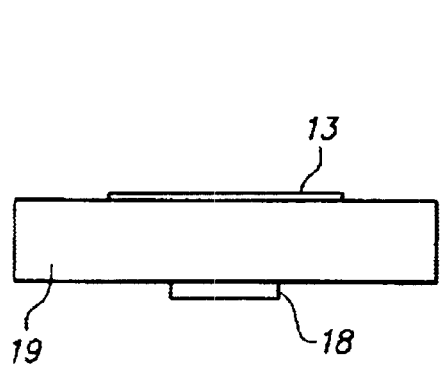
FIG. 5 shows a side view of an alternative embodiment of a waveguide-reflective array of the present invention.
Figure 6:
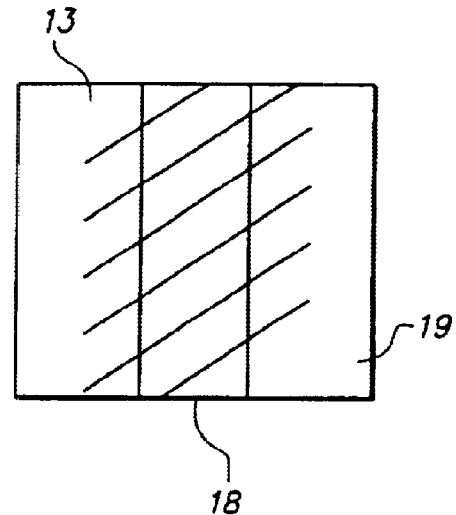
FIG. 6 shows a plan view of the embodiment of FIG. 5.

Distinct from Rayleigh waves, plate waves such as shear waves (e.g., ZOHPS and HOHPS) and Lamb waves have significant acoustic power density at both the top and bottom surfaces of the substrate in which they travel. FIGS. 4, 5, and 6, illustrate an alternate preferred embodiment, in which the wave guide 18 is coupled to a first surface of the substrate 19 and the reflective array is coupled to a second surface of the substrate 19. In an alternate embodiment the waveguide and the reflective array are reversed. In addition, there may be multiple waveguides and/or arrays on either or both surfaces.

Figure 8:
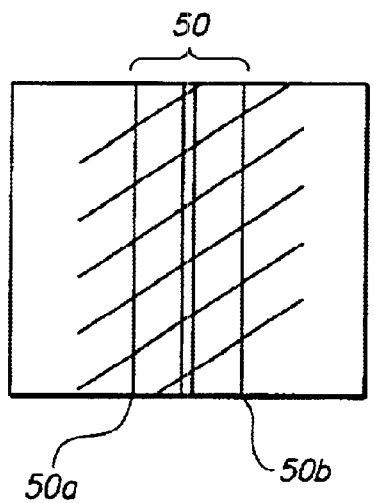
FIG. 8 shows a plan view of the embodiment of FIG. 7.
Figure 7:
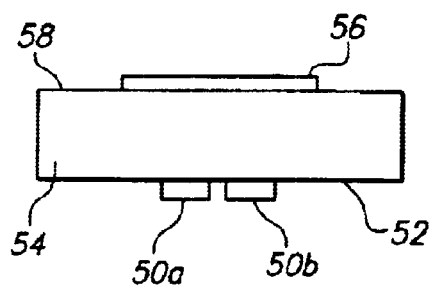
FIG. 7 shows a side view of another alternative embodiment of a waveguide-reflective array of the present invention.
Figure 9:
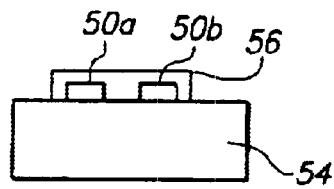
FIG. 9 shows a side view of another alternative embodiment of a waveguide-reflective array of the present invention.

FIGS. 7 and 8 illustrate another alternative embodiment of the waveguide/reflective array combination. In this embodiment, the waveguide 50 is composed of an electrically conductive material, for example glass-frit loaded with silver particles. This enables the waveguide to perform as an electrical connection to a transducer with which it is associated. Because a transducer requires at least two electrical connections, the waveguide 50 includes two elements 50a, 50b. As shown in FIG. 7, the waveguide 50 is coupled to a first side 52 of the substrate 54 and the reflective array 56 is coupled to a second side 58 of the substrate 54. As shown in FIG. 9, alternatively, the waveguide 50 and the reflective array 56 are coupled to the same side of the substrate 54. In this configuration, the waveguide 50 is applied to the substrate 54 and cured and thereafter the reflective array made of, for example UV curable material is applied on top of the waveguide.

Referring again to FIG. 4, an acoustic touchscreen 11a according to the present invention is schematically depicted. With the presence of the waveguides 18, the reflective elements 14 of the arrays 24 may be narrower than in conventional arrays, as may be the transmitting transducers 23a and 23b and the receiving transducers 26a and 26b. Consequently, the border regions 15a are narrower than in conventional touchscreens.

Those skilled in the art will appreciate that a touchscreen will not necessarily have border regions of equal width on all four sides. Indeed, to emphasize this point, in FIG. 4 touchscreen 1a has deliberately been drawn with one border region 15a (the bottom one) wider than the other ones. This will be especially true in the case of a touchscreen for use with a CRT or liquid crystal display (LCD) made by someone other than the touchscreen manufacturer. The CRT or LCD manufacturer may make a display having border regions of unequal width for design considerations having nothing to do with touchscreens. Thus, some border regions may be able to accommodate a conventional reflective array, while other border regions will require a waveguided reflective array according to the present invention. The present invention does not require that all the reflective arrays in a touchscreen work with a waveguide or that the waveguide length is the same as the array length. Where a border region is sufficiently wide, a waveguided array need not be used (although its use is not precluded). Depending on the width of the border regions, a rectangular touchscreen may have one, two, three, or four waveguided arrays.

Figure 10:
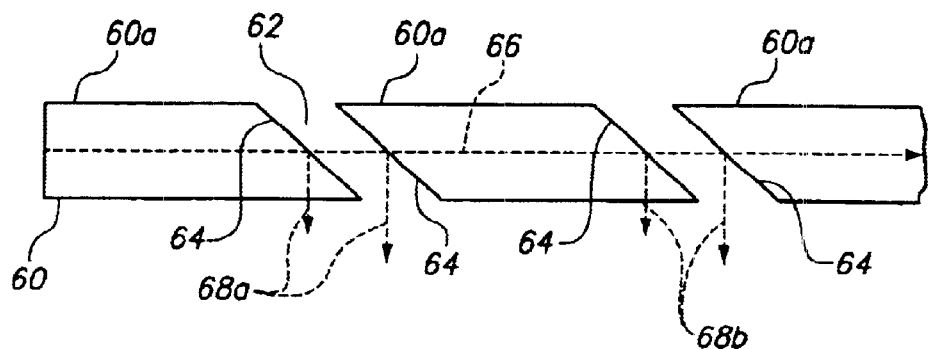
FIG. 10 shows a plan view of another alternative embodiment of a waveguide-reflective array of the present invention.

FIG. 10 illustrates another alternative embodiment of the present invention. Herein, the array of reflective elements is "built" into the waveguide. The waveguide 60 is segmented into a plurality of portions 60a. The waveguide 60 is separated along its length by a gap 62 between each portion 60a. Preferably, the gap 62 is $(n+\frac{1}{2})\lambda$, where n is any integer and where $\lambda$ is the wavelength. Each portion 60a has at least one diagonal face 64, which acts as acoustically reflective element for deflecting energy from the acoustic wave 66 across the touchscreen surface.

Figure 11A:
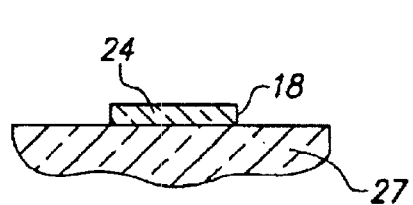
FIGS. 11a, 11b, 11c, 11d and 11e show in cross section various embodiments of a waveguide of the present invention.
Figure 11B:
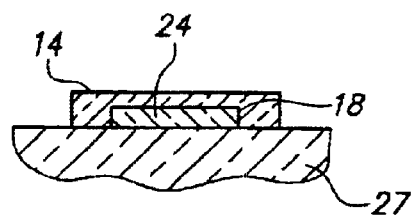

Conceptually, an acoustic waveguide is similar to an optical waveguide: it consists of a core material surrounded by a cladding material, with the guided wave (whether an optical or acoustic one) having a slower propagation speed in the core region than in the cladding region. FIG. 11a shows in cross-section how an acoustic waveguide 18 may be constructed on the surface of a touchscreen. A core 24 (e.g., glass frit or silver loaded glass frit) is deposited on the touchscreen substrate 27, which is typically made of glass (e.g., borosilicate or soda lime). Because an acoustic wave travels more slowly in the core 24 than in the substrate 27, the substrate 27 effectively acts as a cladding. FIG. 11b shows in cross-section how a reflective element 14 may be formed on top of the waveguide 18. Alternatively, the waveguide and the array could be formed of the same material in the same manufacturing step.

Figure 11C:
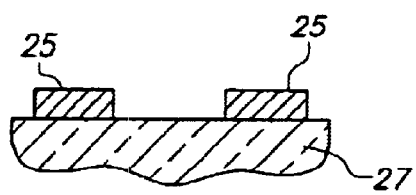

FIG. 11c shows an alternative waveguide construction, in which the deposited material is a cladding 25, having a higher propagation speed than substrate 27, which in this instance then acts as the core. Thus, the construction of FIG. 11c is an inverse of that of FIG. 11a.

Figure 11D:
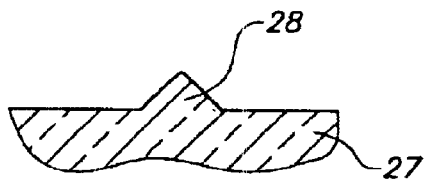
Figure 11E:
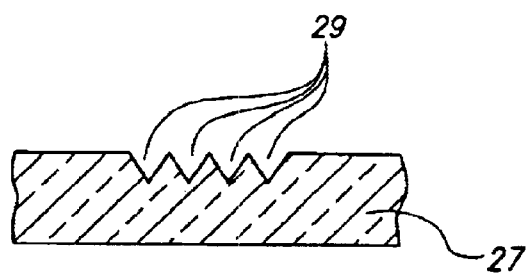

The waveguides of FIGS. 11a and 11c are examples of overlay waveguides, so named because a strip of one material is placed on top of a substrate of another material. Other types of waveguides may be employed, such as topographic waveguides, in which the waveguide is formed via a local deformity in the substrate surface. FIG. 11d shows a topographic waveguide, in which wedge 28 is the deformity. The deformity may have other shapes, for example a rectangular ridge. Those skilled in the art will appreciate that many designs of waveguides suitable for use in this invention are possible, by reference to publications such as Oliner, "Waveguides for Acoustic Surface Waves: A Review," Proc. IEEE, Vol. 64, No. 5, pp. 615–625 (May 1976) and the references cited therein. The waveguide and/or the reflector arrays may be made of, for example glass frit. Alternatively, the waveguide may be a cut-out or a valley in the substrate. The waveguide may also be a plurality of cut outs or valleys wherein the cut outs occur within a strip of width y.

Referring to FIGS. 4 and/or 10, the inclusion of the waveguide enables the reflective arrays to have a narrower width than conventional arrays relative to the length of the array. This array may have an averaged width or transverse dimension, in units of wavelength, of less than about ⅓ the square root of a longitudinal dimension of the array, also in units of wavelength. Averaged width is intended to define the average width of the array taken over the length of the array.

The foregoing detailed description of the invention includes passages that are chiefly or exclusively concerned with particular parts or aspects of the invention. It is to be understood that this is for clarity and convenience, that a particular feature may be relevant in more than just the passage in which it is disclosed, and that the disclosure herein includes all the appropriate combinations of information found in the different passages. Similarly, although the various figures and descriptions herein relate to specific embodiments of the invention, it is to be understood that where a specific feature is disclosed in the context of a particular figure or embodiment, such feature can also be used, to the extent appropriate, in the context of another figure or embodiment, in combination with another feature, or in the invention in general.

Further, while the present invention has been particularly described in terms of certain preferred embodiments, the invention is not limited to such preferred embodiments. Rather, the scope of the invention is defined by the appended claims.

What is claimed is:

1. A touchscreen comprising
   (a) a substrate capable of propagating acoustic waves, having
      (i) a touch-sensitive area and
      (ii) a border region along the touch-sensitive area;
   (b) an array of partially acoustically reflective elements having a transverse dimension, the array located in a portion of the border region and positioned to transmit or receive an acoustic signal into or out of the touch-sensitive area;
   (c) an acoustic waveguide located in the portion of the border region, the acoustic waveguide having a transverse dimension less than the array transverse dimension.

2. A touchscreen as recited in claim 1, further comprising:
   a second array of partially acoustically reflective elements located in a second portion of the border region and positioned to receive an acoustic signal after the acoustic signal has traveled across the touch-sensitive area; and
   wherein the first array is positioned to transmit the acoustic signal into the touch sensitive region and the waveguide is located in either the first portion or the second portion of the border region.

3. A touchscreen according to claim 2, further comprising a first transducer acoustically coupled to the surface of the substrate and positioned to transmit an acoustic signal along the first portion of the border region and a second transducer acoustically coupled to the surface of the substrate and positioned to receive an acoustic signal traveling along the second portion of the border region.

4. A touchscreen according to claim 3, wherein at least one of the first and second transducers is a focusing transducer.

5. A touchscreen according to claim 1, wherein the waveguide is an overlay waveguide.

6. A touchscreen according to claim 1, wherein the waveguide is a segmented waveguide.

7. A touchscreen according to claim 1, wherein the waveguide is a topographical waveguide.

8. A touchscreen comprising:
   a substrate capable of propagating acoustic waves having a touch sensitive area and a border region along the touch sensitive area;
   an array of partially acoustically reflective elements attached to a first surface of the substrate, located in a portion of the border region, and positioned to transmit or receive an acoustic signal into or out of the touch sensitive area; and
   an acoustic waveguide attached to a second surface of the substrate and located in the portion of the border region to direct an acoustic signal along the linear array.

* * * * *